United States Patent [19]

Kirma

[11] Patent Number: 5,377,939
[45] Date of Patent: Jan. 3, 1995

[54] DEVICE FOR MOUNTING ELONGATED COMPONENTS, SUCH AS ELECTRICAL WIRING, ESPECIALLY IN AN AIRCRAFT

[75] Inventor: Safa Kirma, Wedel/Holstein, Germany

[73] Assignee: Deutsche Aerospace Airbus GmbH, Hamburg, Germany

[21] Appl. No.: 28,829

[22] Filed: Mar. 10, 1993

[30] Foreign Application Priority Data

Mar. 11, 1992 [DE] Germany ............................ 4207666

[51] Int. Cl.6 ............................................. F16L 3/22
[52] U.S. Cl. ...................... 248/68.1; 24/543; 411/60
[58] Field of Search ............. 248/68.1, 69, 74.1, 248/73, 65, 71; 24/543; 411/60; 174/157

[56] References Cited

U.S. PATENT DOCUMENTS

| | | | |
|---|---|---|---|
| 2,361,943 | 11/1944 | Issoelio et al. | 248/68.1 X |
| 2,404,531 | 7/1946 | Robertson | 248/68.1 |
| 3,531,071 | 9/1970 | Kubli | 248/68.1 |
| 3,682,422 | 8/1972 | Evans | 248/68.1 |
| 4,030,540 | 6/1977 | Roma | 248/68.1 X |
| 4,242,939 | 1/1981 | Osborne et al. | 411/60 X |
| 4,865,246 | 9/1989 | Miyanaga | 411/60 X |
| 4,929,134 | 5/1990 | Bergner | 411/60 X |
| 5,098,047 | 3/1992 | Plumley | 248/68.1 |
| 5,205,520 | 4/1993 | Walker | 248/68.1 X |
| 5,211,512 | 5/1993 | Frischmann et al. | 411/60 X |

FOREIGN PATENT DOCUMENTS 0047504 8/1976 Australia ............................ 411/60

*Primary Examiner*—Ramon O. Ramirez
*Attorney, Agent, or Firm*—W. G. Fasse; W. F. Fasse

[57] ABSTRACT

Elongated components such as electrical wiring, electrical cables, piping, rods, ropes, and steel cables are mounted in place, for example, in an aircraft body, by a mounting device that has at least two mounting sections. At least one, preferably both mounting sections are provided with component holding channels. When the two mounting sections are held together they form a block in which the components are held in the respective through-going channels. The mounting block is locked to a support, such as a wall member. The closing and thus the connection of the two mounting sections to each other and the clamping of the elongated components in the channels as well as the locking of the device to the support is accomplished by a mechanism that performs all three functions. In one embodiment the mechanism includes a connecting bolt holding at one end an expander dowel and on its threaded other end a clamping nut, whereby the expander dowel is expanded by a pulling action. In another embodiment the expander dowel is expanded by a pushing action resulting from the connecting and clamping of the two mounting sections to each other by one or two spring bails.

17 Claims, 7 Drawing Sheets

DEVICE FOR MOUNTING ELONGATED COMPONENTS, SUCH AS ELECTRICAL WIRING, ESPECIALLY IN AN AIRCRAFT

FIELD OF THE INVENTION

The invention relates to a mounting device for elongated components. Such elongated components may, for example, include cables, electrical wiring, pipes, rods, and ropes or mechanical cables. Such mounting devices are generally useful but particularly applicable in the aircraft industry.

BACKGROUND INFORMATION

These mounting devices are conventionally secured to a support and have at least one recess or channel through which the elongated component extends or in which the component is held. Conventional mounting blocks of this type have at least one bore extending substantially perpendicularly to a mounting surface and a connecting element extends through such bore, for example in the form of a screw or other mounting means. The manual installation of such elongated components is time consuming, especially when the available space is limited, such as in an aircraft. Time must be spent for the securing of the mounting device to the support and for the insertion of the elongated components into the mounting device. Additionally, complicated electrical wiring systems as are standard in an aircraft, require the attachment of a multitude of parallel wires to the mounting devices or holding elements, whereby again the performance of the complete installation is cumbersome and takes a substantial length of time. Furthermore, conventional devices do not assure that each and everyone of these devices is attached with the required strength to the support structure to avoid uninteded loosening.

OBJECTS OF THE INVENTION

In view of the foregoing it is the aim of the invention to achieve the following objects singly or in combination:

to construct a device of the type described above in such a way that its mounting is simplified and the entire installation time is reduced;

to construct a mounting device for elongated components in such a way that the elements of the device cooperate with each other that several functions are achieved simultaneously;

to quickly and securely attach a mounting device for elongated components to a support wall even if the backside of the support wall is not accessible, and without the need for tools;

generally to substantially reduce the effort and expense especially the man-hours needed for installing such devices;

to make sure that an unintended loosening of the mounting device from its support is prevented; and to construct such mounting devices in such a way that the securing to the support can be accomplished either by a pulling force or by a pushing force without separate tools.

SUMMARY OF THE INVENTION

The above objects have been achieved in a mounting device according to the invention that has at least two mounting sections held together by a connecting element that engages directly or indirectly a locking element and cooperates with another end with a clamping device. Preferably, the locking element is an expander dowel spreadable either by an expander head exposed to a pulling force or an expander pin exposed to a pushing force. The two sections are held together to form a block and component holding channels pass through the block preferably in such a way that one half of each channel is located in each of two neighboring block forming sections. The connecting element cooperates with a clamping device that can either be provided in the form of a threaded nut engaging a threaded end of the connecting element or in the form of a spring clamping bail holding both sections together while simultaneously causing the connecting element to push an expander or spreader pin into an expander dowel whereby the expanded dowel or dowels securely holds the mounting device to the support such as a flat wall.

By coupling the connecting element with the arresting or locking element it is possible in a simple way to accomplish the locking of the mounting device to the mounting wall by an axial displacement of the connecting element, thereby accomplishing a tightening of the locking device, preferably in the form of an expander dowel. The expander dowel makes it possible to mount the device even to a mounting surface formed by a relatively thin wall plate, by spreading out the expander dowel so that it claws itself, so to speak, behind the wall, thereby preventing a lifting or unintended removing of the mounting device from its support. By defining the space in which the elongated component or components are received as channels between at least two mounting sections the assembly of the elongated components in the channels is simplified and so is their securing because one section is simply placed on the other section after the elongated components have been placed into a channel or channels. Preferably, the components are placed into the mounting section that is to be secured to the support and then the second mounting section is used to close the first mounting section, so to speak. However, it is also possible to modify the mounting sequence by first enclosing the elongated components between two neighboring mounting sections to form a block and then to secure the block to the support. This simultaneous enclosing or clamping of the components between two neighboring sections and the locking of the sections to the support even substantially reduces the assembly time. After the components have been enclosed between two mounting sections it is merely necessary to clamp the components together which is accomplished in a single operation when the block is secured to the support. Thus, the number of operational steps has been minimized and the mounting block is securely locked to the support. The invention achieves this safe locking of the mounting device, which is an advantage because after the mounting device has been locked in place, the locking elements themselves are no longer visible. Due to the safe locking it is no longer necessary to visually inspect the present devices for their locked condition.

In one preferred embodiment the connecting element is constructed as a bolt or bar that has a spreader head on one end for spreading the expander dowel with the help of a clamping device in the form of a nut, preferably a manually operable nut, that engages the other threaded end of the connecting bolt or bar to which the clamping nut applies a pulling force for the locking or arresting of the mounting device to the support.

An unintended release of the locking of the mounting device from its support is prevented by providing the clamping nut with ratchet detents that cooperate with an arresting lever, whereby the elongated components are also prevented from becoming loose. Preferably, the ratchet detents and the arresting lever are so constructed that the tightening of the nut is permitted but its loosening is prevented.

In order to assure a proper clamping of the elongated components between two neighboring mounting sections and to simultaneously avoid the formation of many contact points between two neighboring mounting sections, the invention provides a recess in at least one of two neighboring mounting sections. The recess is so positioned that it faces the interface between two neighboring mounting sections and minimizes the contact points but still assures a proper formation of the holding channels for the elongated components. Such a structure does not require maintaining high manufacturing tolerances, yet assures a proper mounting of the elongated components with the desired clamping function to prevent component displacement.

The present clamping device also assures the mounting of the elongated components in parallel to each other by the arrangement of the holding channels in parallel to each other, whereby several holding channels may be positioned in the same plane next to one another horizontally or in a plane one above the other vertically or in a clustered arrangement.

It is possible to assemble more than two mounting sections to form a block. In such an assembly at least one of the mounting sections is provided with channel forming recesses on opposite surfaces, so that one section cooperates with two other sections in the formation of the block. This arrangement minimizes the number or required elements.

In order to properly hold or clamp the elongated components in their respective channels, the channel surfaces may be provided with at least one projection that engages the respective component. By properly clamping the components in their channels it is assured that the components take up the desired installed position, for example, to avoid slack and without twisting.

The projection or land that engages the elongated component is so constructed that it also prevents a twisting of the installed wires or cables. For this purpose the projection may have a rounded contour surface for engaging the elongated component. Further, the projection may engage a slot in the elongated component. Such a slot may extend along the entire length of the component.

In another embodiment of the invention, the connecting and clamping device operates a plurality of locking elements with the help of a bar or plate functioning as a lever and engaging a plurality of locking elements.

Where a plurality of locking elements are activated by a single connecting and clamping device it is preferable that the locking elements are guided in a bore in the respective mounting section at least at one end of the locking element. Preferably both ends of the respective locking element are received in the guide bore.

According to another embodiment of the invention the arresting or locking elements are operable by an axially applied pushing force rather than by a pulling force. For this purpose the connecting element is provided with a pressure application head opposite its tip engaging the expander dowel. The pressure application head is so dimensioned that when two mounting sections are clamped to each other the connecting element is pushed into the expander dowel. Preferably, one of the mounting sections functions as the pushing element in response to clamping the two mounting sections together. However, an intermediate element may be used for this purpose, such as a crossarm.

Where a clamping bail is used for holding at least two mounting sections together it is preferable that one of the mounting sections is tiltable relative to the other mounting section by a hinge.

Where two or more mounting sections are held together by a clamping bail to avoid screw connections, the clamping bail is hinged to one of the mounting sections and engages with its free end a locking detent.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
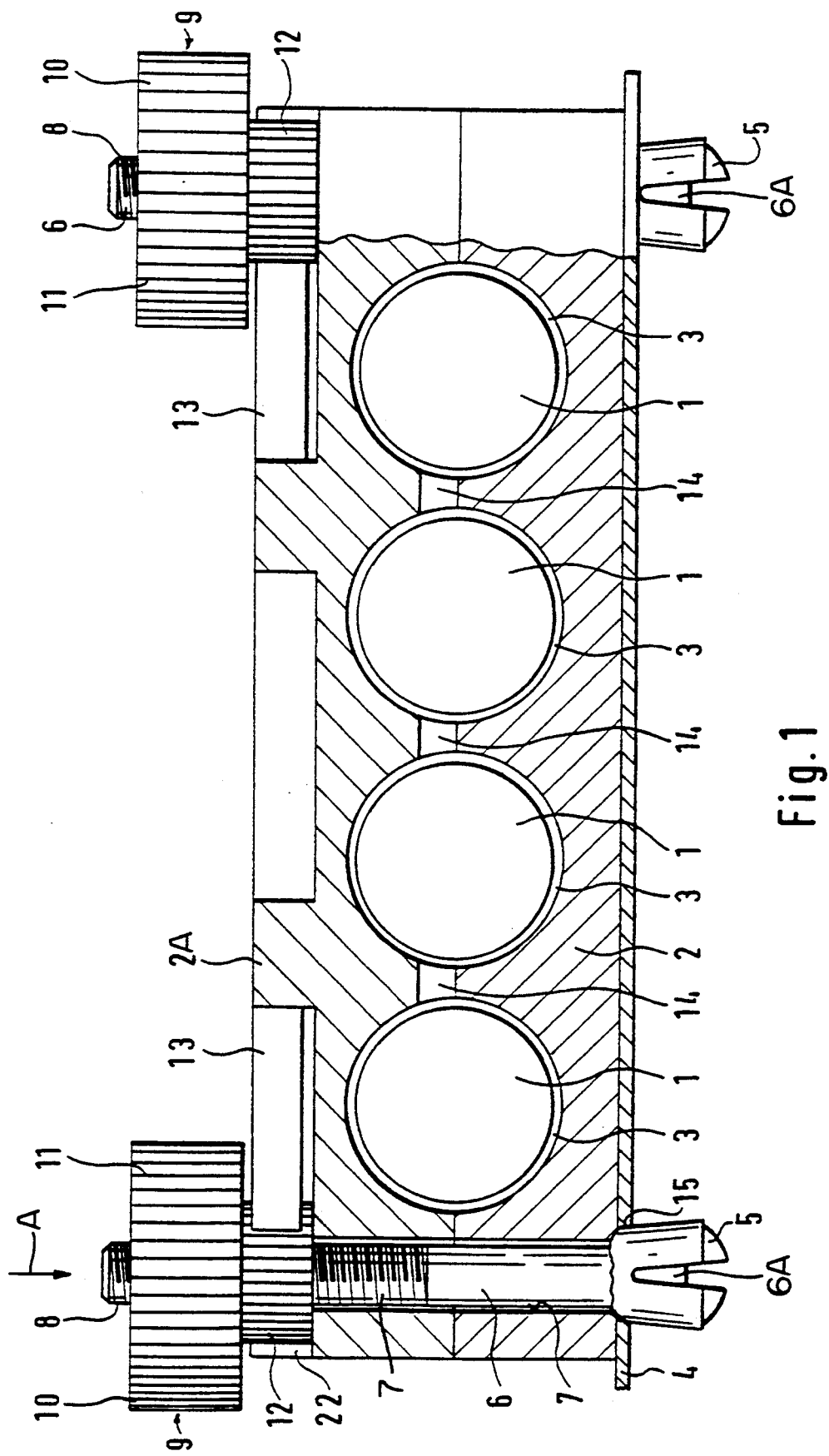
FIG. 1 shows a sectional view of a first embodiment of a mounting device for elongated components, wherein the locking, connecting, and clamping is accomplished by expander dowels, a threaded bolt, and a clamping nut, wherein four elongated component receiving channels are arranged in a row.

FIG. 1 shows a sectional view of a first embodiment of a mounting device according to the invention for holding elongated components 1. The device comprises two mounting sections 2 and 2A which together form a block in which channels 3 are formed for holding and clamping the components 1. Preferably, the channels 3 are so formed that cylindrical half channels are located in each mounting section whereby two half channels facing each other form a full channel to receive and hold a component 1. Four channels are arranged in a row for example.

One or more locking, connecting, and clamping mechanisms are used to lock the mounting block to a support 4 such as a wall member in an aircraft or the like. Each of the locking, connecting, and clamping mechanisms in FIG. 1 comprises an expander dowel 5 shown in more detail in FIG. 6, a connecting bolt 6 having a threaded end 8 and a clamping nut 9. The connecting bolt 6 passes slidably and longitudinally through aligned bores 7 in the mounting sections 2 and 2A. The bore 7 extends substantially perpendicularly to the support 4.

In the embodiment of FIG. 1 two mounting sections 2, 2A are used as mentioned. Both sections are held together by the cooperation of the elements 5, 6 and 9 which simultaneously secure the mounting block to the support 4 by the spreader action of a spreader head 6A at the lower end of the bolt 6 for expanding the dowel 5, which is received in a bore 15 of the support 4. The spreader action is accomplished by tightening the nut 9, for example manually whereby the bolt 6 pulls the spreader head 6A axially into the dowel 5 to spread and anchor the dowel 5. For this purpose the nut 9 has a head 10 with knurls 11 to provide a proper grip. By rotating the nut 9 clockwise, as viewed in the direction around the arrow A, the spreader head 6A of the bolt 6 is pulled into the expander dowel 5 thereby locking the mounting formed by the two sections 2, 2A block to the support 4, connecting the two sections 2 and 2A to each other and clamping the components 1 in their channels 3.

In order to permit a tightening of the nuts 9 while preventing their loosening, the nuts 9 have a lower extension 12 with ratchet detends cooperating with a locking tongue 13 rigidly secured to the upper mounting section 2A. The engagement of the free end of the tongue with the detends in the nut extension 12 prevents an unintentional rotation of the nut 9. An intentional loosening is possible by manually disengaging the tongue 13 from the respective detend. For this purpose, the tongues 13 are sufficiently flexible.

In order to assure a proper clamping of the components 1 in their channels 3 it is preferable that at least one of the mounting sections 2 or 2A is provided with a recess 14 to assure that the components are contacted by the inner channel surfaces before a complete rigid contact between the surfaces of the sections 2, 2A facing each other prevents such a clamping action to be applied to the components 1. The recess 14 has the advantage that manufacturing tolerances can be accommodated while still assuring the proper clamping action for the components 1.

The lower detent portion 12 of the clamping nut 9 is preferably recessed between ribs 22 in the upper mounting section 2A.

The mounting of the block is preferably accomplished by preassembling the components 1 between the two mounting sections 2 and 2A, then slightly tightening the nut 9 to hold the sections 2, 2A together without spreading the expander dowels 5, and then inserting the dowels 5 into the bores 15 of the support 4 and tightening the nuts 9. This operation is simple and efficient as it requires little time. Simultaneously, the elements 5, 6 and 9 perform three functions, namely, holding the sections together, locking the sections to the support and maintaining the components 1 in a clamped position. Tools are not required for this operation.

Figure 2:
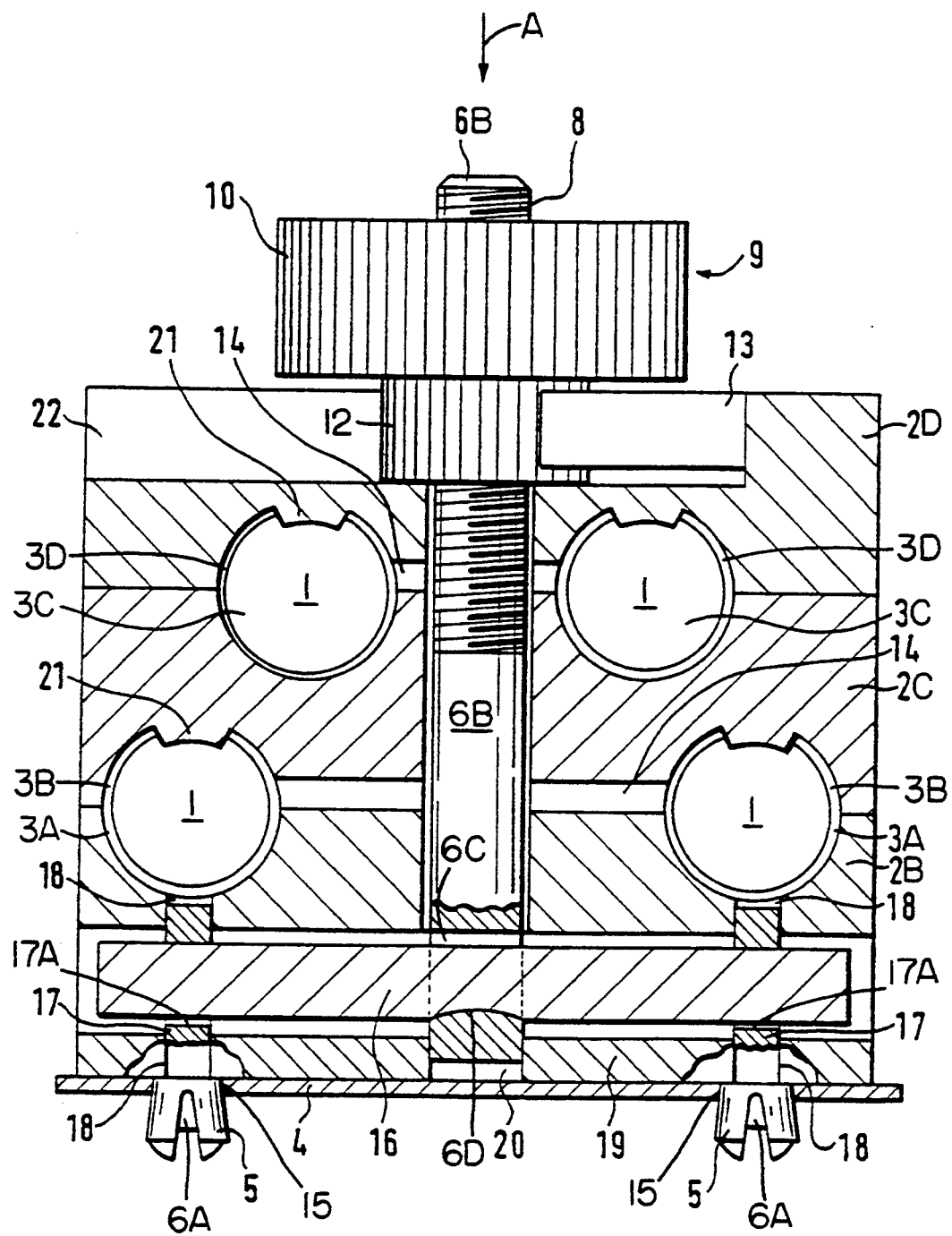
FIG. 2 is an embodiment with three mounting sections and a single connecting and clamping device that operates a plurality of locking elements.

FIG. 2 shows an embodiment of the invention in which again four components 1 are clamped in place however not in a row but in a cluster by three mounting sections 2B, 2C and 2D forming a common block held together by a connecting bolt 6B, that operates in unison a plurality of locking elements 17 through a locking bar or plate 16. The locking elements 17 are guided at least at one end in a bore 18 in the respective mounting section 2B. Preferably, both ends of the locking element 17 are guided in respective holes 18. The lower end of each locking end 17 carries an expander dowel 5 expanded by a spreader head 6A as described. Each locking element 17 has a crosshole 17A through which the locking bar or plate 16 extends. The locking bar 16 passes also through a hole 6C in the connecting bolt 6B. Preferably, the hole 6C has a beaded bottom 6D to properly hold the locking bar 16 in place especially against lateral displacement.

The embodiment of FIG. 2 operates as follows. When the clamping nut 9 is tightened clockwise around the arrow A as viewed in FIG. 2, the bolt 6B and with it the locking bar 6 is lifted, thereby also lifting the locking elements 17 and their spreader head 6A, thereby expanding the dowels 5 in their bores 15 to claw behind the support 4.

In FIG. 2 the mounting sections 2C and 2D are provided with recesses 14 for the same purpose as described above.

Further, the channels 3A in the bottom mounting section 2B cooperate with channels sections 3B in the central mounting section 2C which has two further mounting channel portions 3C cooperating with channels portions 3D in the uppermost mounting section 2D. The channel portions 3B and 3D are provided with projections 21 for an improved clamping of the components 1 in the respective channels. The projections 21 preferably have a rounded surface engaging the components 1 to prevent a rotation of the components in their respective channels and to prevent an axial displacement.

The just described locking operation in FIG. 2 is accomplished by a pulling action when the connecting bolt 6B is moved upwardly in a direction opposite to the arrow A. However, in the embodiment of FIG. 2 a locking action may also be accomplished by spreader dowels of the type shown in FIG. 7 by providing the bolt 6B with a left hand threading, thereby pushing the locking bar 16 downwardly for the spreading of the respective expander dowel. The assembly, mounting, and locking of the embodiment of FIG. 2 is substantially the same as described above with reference to FIG. 1.

Figure 3:
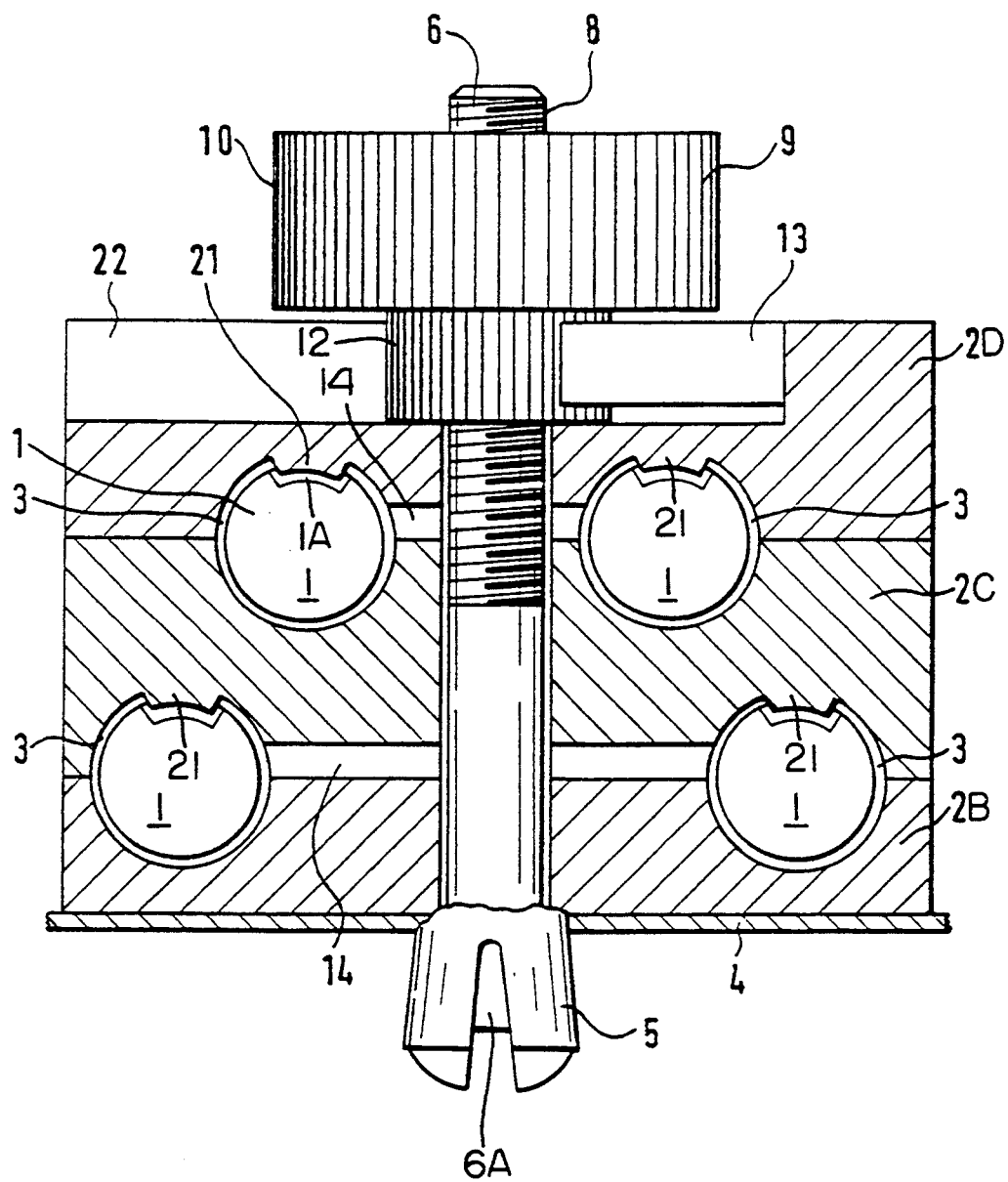
FIG. 3 is an embodiment similar to that of FIG. 2, however only a single locking device with one locking element is used.

FIG. 3 combines the locking, connecting, and clamping mechanism of FIG. with three mounting sections to 2B, 2C and 2D similar to those of FIG. 2, whereby a very simple construction is achieved. The rotation of the components 1 in their respective channels 3 is prevented by the projections 21, which engage in longitudinal grooves 1A of the respective component 1. Since only one connecting, locking, and clamping mechanism is used, the latter will be dimensioned accordingly.

Figure 4:
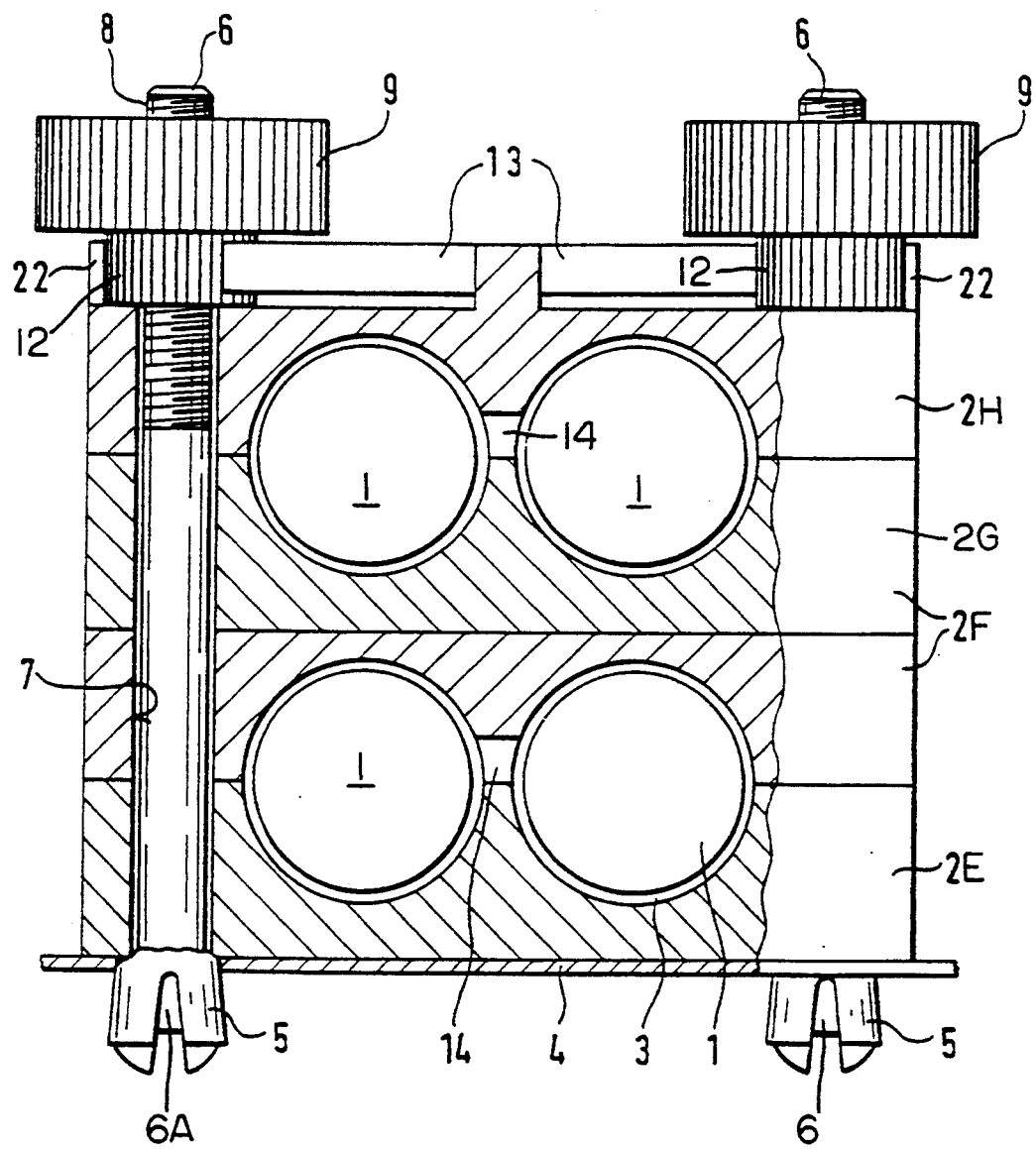
FIG. 4 is an embodiment similar to that of FIG. 3, however the locking, connecting, and clamping is accomplished by elements as shown in FIG. 1.

FIG. 4 is an embodiment with four mounting sections 2E, 2F, 2G and 2H held together by two locking, connecting, and clamping mechanisms as described above in more detail with reference to FIG. 1. This arrangement permits holding and clamping the components 1 in the respective channels 3 at the corners of a rectangle, so to speak. The intermediate section 2F and the upper section 2H are provided with respective recesses 14 for the proper clamping purpose as described above.

Figure 5:
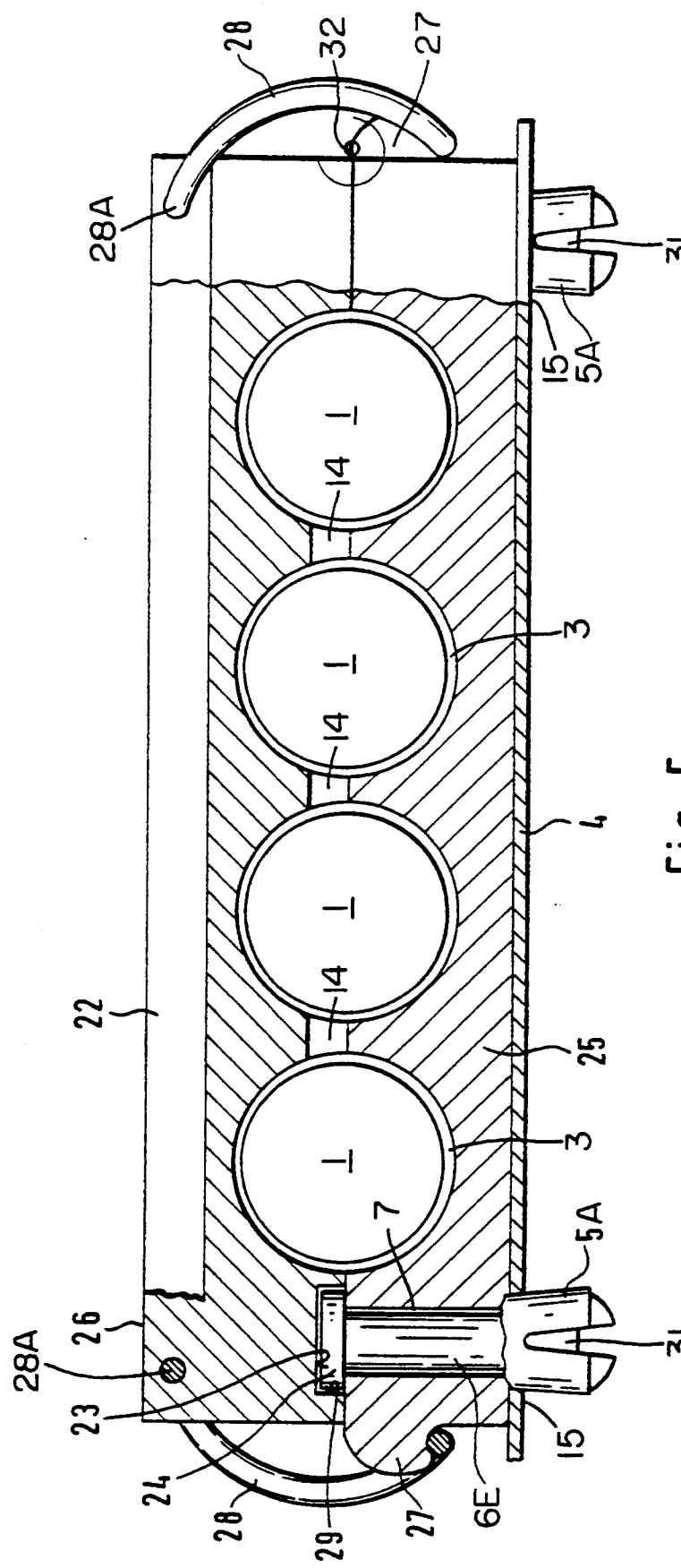
FIG. 5 is a sectional view similar to that of FIG. 1, however illustrating a clamping mechanism with bails rather than clamping nuts, whereby a pushing force expands the locking dowels rather than a pulling force.
Figure 7:
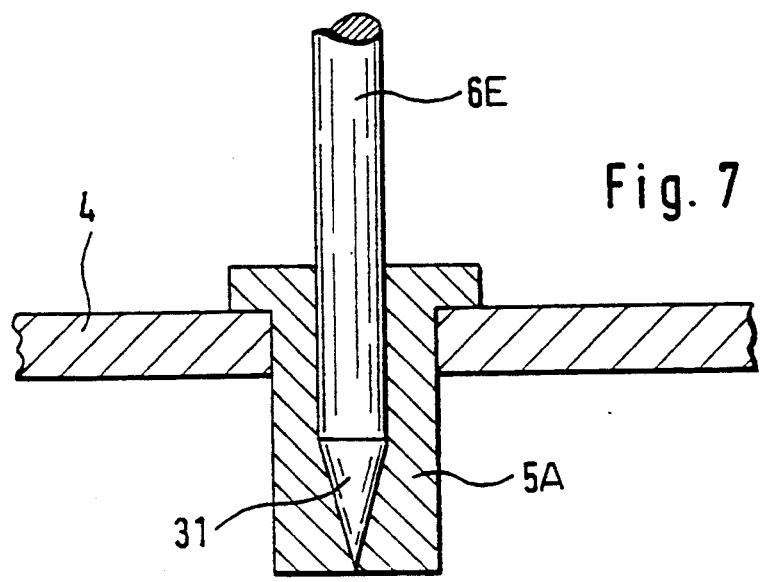
FIG. 7 shows a locking dowel that is expanded by a pushing force.

FIG. 5 shows an embodiment with a modified locking, connecting, and clamping mechanism compared to FIG. 1. The locking in FIG. 5 is accomplished by an expander dowel 5A as shown in FIG. 7 which is expanded by a wedging head 31 of a locking element 6B having a head 24 with a surface 23 to be engaged by a respective surface in a recess 29 of the upper mounting section 26, when the latter is closed against the lower mounting section 25. The axial dimension of the head 24 is slightly smaller than the axial dimension of the recess 29 to make sure that the expander wedge 31 can be sufficiently pushed into the expander dowel 5A for locking the mounting block to the support 4. Initially, the locking element 6B with its head surface 23 projects sufficiently above the rim of the bore 7 in the lower mounting section 25 to permit a sufficient downward push for the spreading or expanding of the dowel 5A. The downward push is limited by the engagement of the head 24 with the rim around the bore 7.

The connecting and clamping is accomplished in FIG. 5 by two spring bails 28, for example, in the form of clip springs hinged to the upper mounting section 26 as shown at 28A and engaging respective locking detents 27, secured to or forming part of the lower mounting section 25.

Figure 5A:
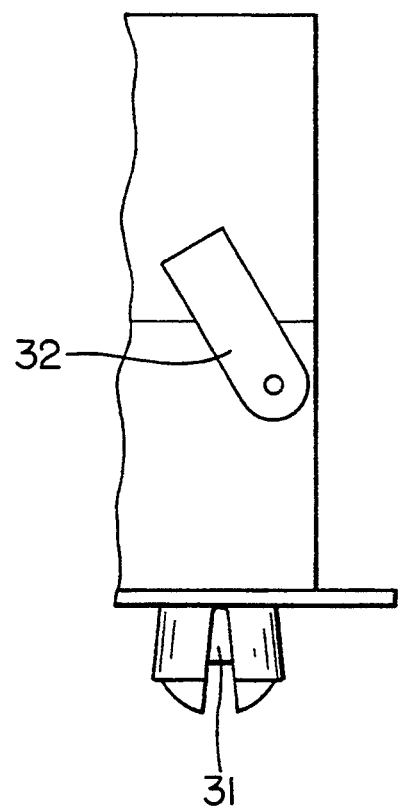
FIG. 5A shows an alternative clamping mechanism using a hinge.

As shown in FIG. 5 the upper section 26 forms a cover for the lower section 25 and the cover is completely removable when the bails 28 are disengaged from the locking detents 27. However, it is also possible to replace the right hand connecting and locking bail 28 by a hinge 32 shown in FIG. 5A and to use only the left hand connecting and clamping bail 28 and detent 27.

Figure 6:
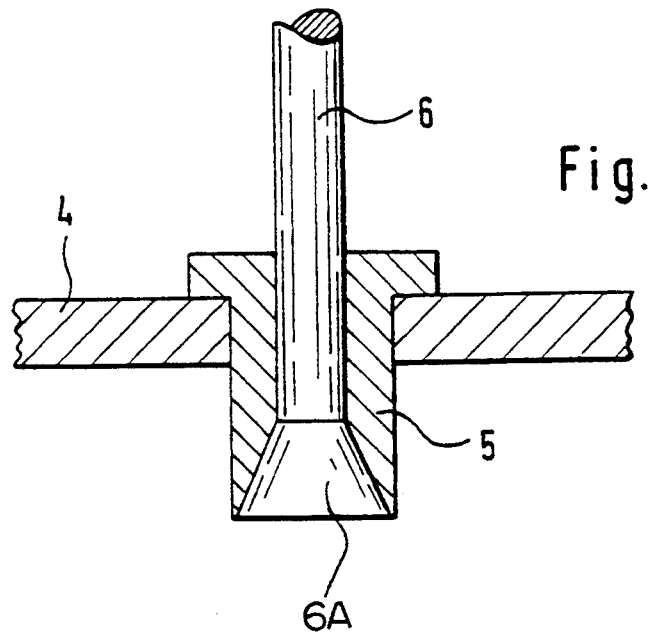
FIG. 6 shows a locking dowel that is expanded by a pulling force.

In FIG. 6 the expander dowel 5 is clawed against the back of the support 4 by an upward axial pull on the connecting element 6 which is axially movable in the bore of the dowel 5, whereby the spreader head 6A forces the dowel against the back of the support 4. The pulling force has not yet been applied.

The embodiment of FIG. 7 shows an expander dowel 5A in which a wedge 31 expands the lower end of the dowel to claw against the support 4 when the element 6E is pushed axially downwardly, for example by closing the block as shown in FIG. 5.

Although the invention has been described with reference to specific example embodiments, it will be appreciated that it is intended to cover all modifications and equivalents within the scope of the appended claims.

What I claim is:

1. A device for blind mounting at least one elongated component to a support wall (4) having at least one mounting throughhole in said support wall, comprising at least one first mounting section (2) and at least one second mounting section (2A) cooperating with said first mounting section (2) to form a mounting block for holding said elongated component (1) in place, component holding channels (3) passing through said mounting block, at least one expander locking dowel (5) held partly in said mounting hole so that said dowel is expandable behind said support wall for securing said block to said support wall, at least one connecting bolt (6) axially passing through a bore (7) in said block and engaging said locking dowel (5) for expanding said locking dowel (5) behind said support wall (4), and a clamping member (9, 28) for axially displacing said connecting bolt (6) in said bore for expanding said locking dowel (5) thereby simultaneously holding said first and second mounting sections (2, 2A) together, holding said elongated component (1) in said channels (3), and tightening said locking dowel (5) behind said support wall (4) to blind mount said mounting block in place, and wherein at least one of said mounting sections (2, 2A) comprises a recess for an improved elastic clamping action.

2. The device of claim 1, wherein said at least one connecting bolt comprises an expander head (6A) engaging said expander dowel (5) for expanding said expander dowel behind said support wall, said bolt having an external threading at its end opposite said expander head, said clamping member comprising a threaded member (9) engaging said external threading for tightening behind said support wall said expander head by a pulling action.

3. The device of claim 2, wherein said threaded member comprises a threaded clamping nut configured for manual operation of said threaded clamping nut.

4. The device of claim 3, further comprising ratchet detents (12) as part of said nut and an arresting lever (13) as part of one of said mounting sections (2A), said detent and arresting lever cooperating with each other for preventing an unintended loosening of said threaded clamping nut.

5. The device of claim 1, wherein said clamping members comprise two spring bails (28) journalled to one of said mounting sections, and respective detents (27) on the respective other mounting section for engaging free ends of said spring bails when said two mounting sections are clamped to each other.

6. The device of claim 5, wherein said recess is positioned in a wall of said one mounting section that faces the respective other mounting section.

7. The device of claim 1, wherein said mounting sections form at least two of said component holding channels arranged next to each other in one plane.

8. The device of claim 1, wherein said mounting sections form at least two of said component holding channels arranged one above the other.

9. The device of claim 1, wherein said component holding channels are formed in at least one of said mounting sections, while the other mounting section closes said component holding channels.

10. The device of claim 1, further comprising at least two expander dowels, and locking elements (17) engaged by said bar (16) for spreading said expander dowels through said bar (16) operated by said bolt (6B) activated by said clamping member.

11. The device of claim 12, wherein at least one of said mounting sections comprises guide means (18) for guiding said locking elements.

12. The device of claim 11, wherein said locking elements (17) have central through-holes (17A) through which said bar (16) extends, said locking elements (17) having two ends one on each side of said through-hole (17A), and wherein each end of said locking elements is received in a guide bore forming said guide means (18).

13. The device of claim 1, further comprising a hinge (32) for connecting said mounting sections to each other, whereby one mounting section is tiltable toward the other mounting section, and wherein said clamping member comprises a clamping bail for clamping said mounting sections to each other on a side opposite said hinge.

14. A device for blind mounting at least one elongated component to a support wall (4) having at least one mounting throughhole in said support wall, comprising at least one first mounting section (2) and at least one second mounting section cooperating with said first mounting section (2) to form a mounting block for holding said elongated component (1) in place component holding channels (3) passing through said mounting block, at least one expander locking dowel (5) held partly in said mounting hole so that said dowel is expandable behind said support wall for securing said block to said support wall, at least one connecting bolt (6) axially passing through a bore (7) in said block and engaging said locking dowel (5) for expanding said locking dowel (5) behind said support wall (4), and a clamping member (9, 28) for axially displacing said connecting bolt (6) in said bore for expanding said locking dowel (5) thereby simultaneously holding said first and second mounting sections (2, 2A) together, holding said elongated component (1) in said channels (3), and tightening said locking dowel (5) behind said support wall (4) to blind mount said mounting block in place, wherein at least one of said component holding channels has an inwardly reaching projection for an improved clamping action to hold said elongated component is place.

15. The device of claim 14, wherein said projection forms a radially inwardly reaching land having a rounded contour for engaging said elongated component, preferably in a groove thereof.

16. A device for mounting elongated components to a support having at least one mounting hole in said support, comprising at least one first mounting section (2) and at least one second mounting section (2A) cooperating with said first mounting section (2) to form a mounting block for holding said elongated components (1) in place, component holding channels (3) passing through said mounting block, locking means (5) held in said mounting hole for securing said block to said support, connecting means (6) passing through a bore (7) in said block and engaging said locking means (5) for tightening said locking means in said support (4), and clamping means (9, 28) cooperating with said connecting means (6) and through said connecting means (6) with said locking means (5) for simultaneously holding said first and second mounting sections (2, 2A) together, holding said elongated components (1) in said channels (3), and tightening said locking means (5) in said support (4) to mount said block in place, and wherein said locking means comprise an expander dowel (5A) and a wedging means (6E, 31) for spreading said expander dowel by a pushing force, wherein said connecting and clamping means comprise bail means (28) and detent means (27) for clamping and connecting said at least two mounting sections to each other, and wherein said wedging means are so positioned in one of said mounting sections that clamping said at least two mounting sections to each other pushes said wedging means into said expander dowel for a locking action behind said support.

17. The device of claim 16, wherein said wedging means comprise a pin (6E) passing through a bore in one mounting section (25), said pin having a head (24) extending into a recess (23) in the other mounting section (26), whereby clamping said mounting sections to each other causes said locking action.

* * * * *

UNITED STATES PATENT AND TRADEMARK OFFICE
CERTIFICATE OF CORRECTION

PATENT NO. : 5,377,939

DATED : January 3, 1995

INVENTOR(S) : Safa Kirma

It is certified that error appears in the above-identified patent and that said Letters Patent is hereby corrected as shown below:

On the title page:

In [56] "Issoelio et al." should read --Issoglio et al.--.

In column 1, line 37, replace "uninteded" by --unintended--.

In column 3, line 43, replace "tion,for" by --tion, for--.

In column 5, line 24, replace "detends" by --detents--;
             line 27, replace "detends" by --detents--.

In column 6, line 42, replace "to" by --2--.

In column 8, claim 10, claim line 1, after "comprising" insert
             --a bar (16) operable by said at least one
                bolt (6B),--;

In column 8, claim 14, claim line 5, after "section" insert
             --(2A)--;
                     claim line 7, after "place" insert --,--.

In column 9, claim 14, claim line 26, replace "is" by --in--.

Signed and Sealed this

Eleventh Day of April, 1995

*Attest:*

BRUCE LEHMAN

*Attesting Officer*          *Commissioner of Patents and Trademarks*